Figure 1:
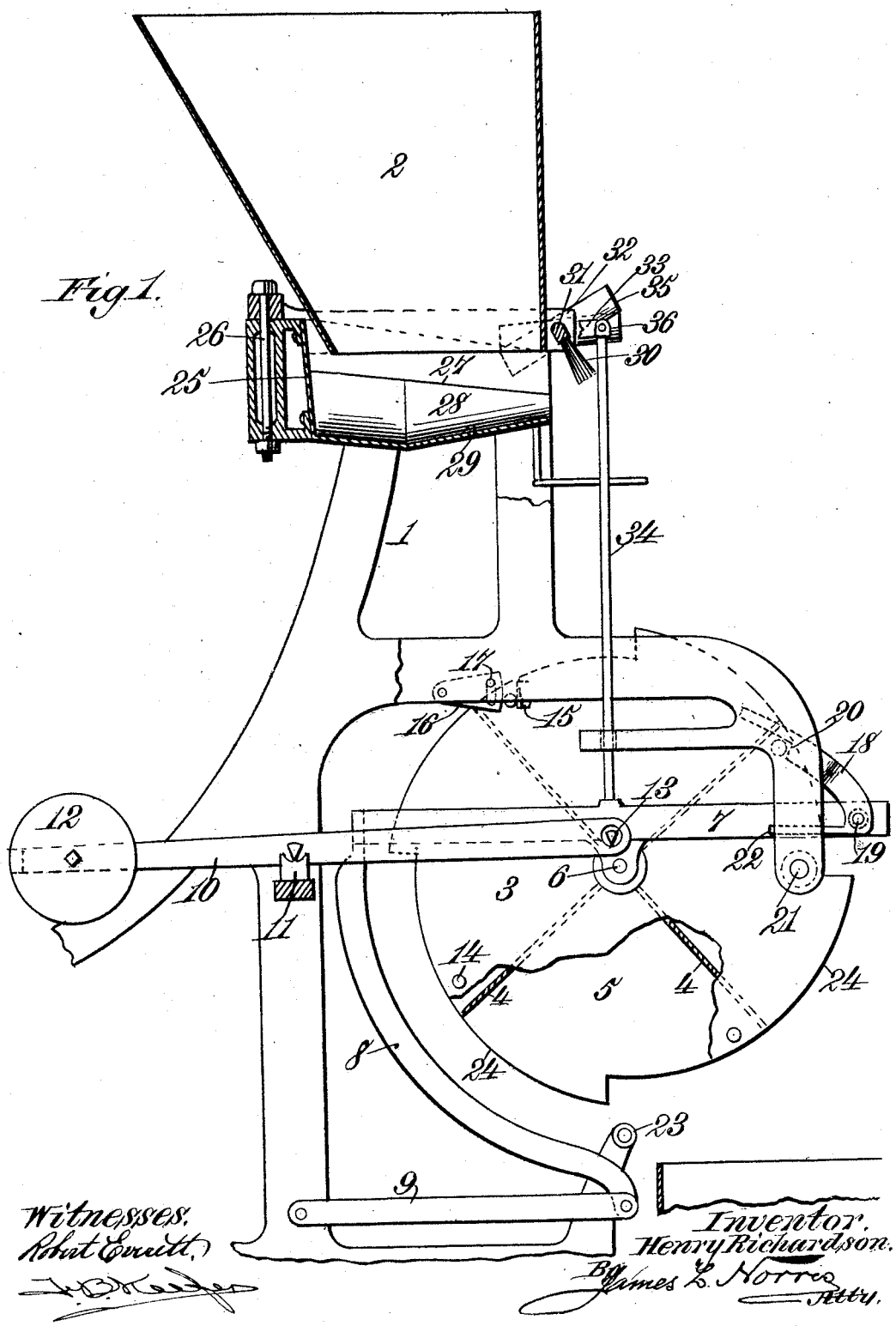

H. RICHARDSON.
WEIGHING MACHINE.
APPLICATION FILED AUG. 19, 1909.

975,158.

Patented Nov. 8, 1910.

3 SHEETS—SHEET 1.

Witnesses.

Inventor.
Henry Richardson.

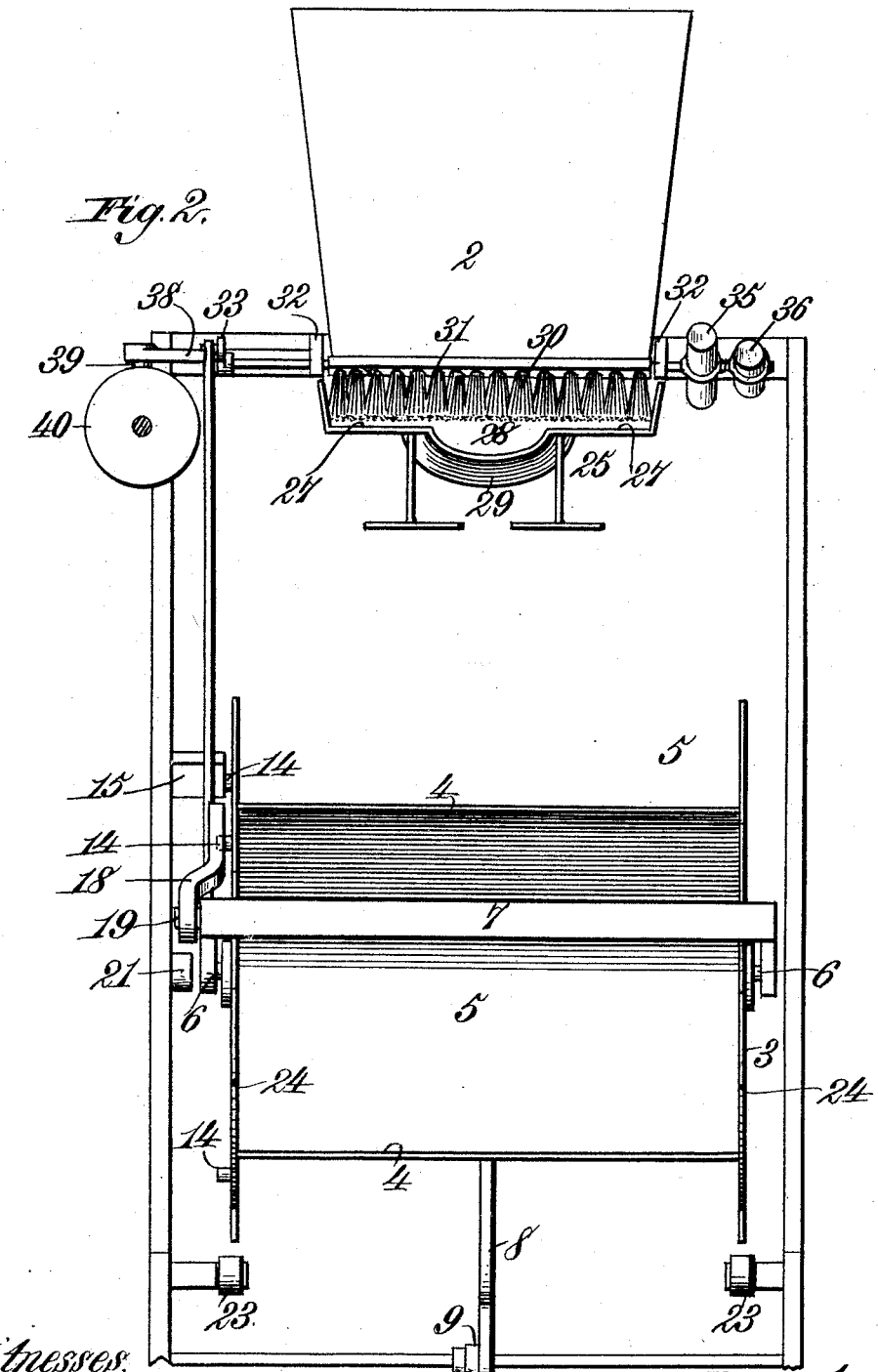

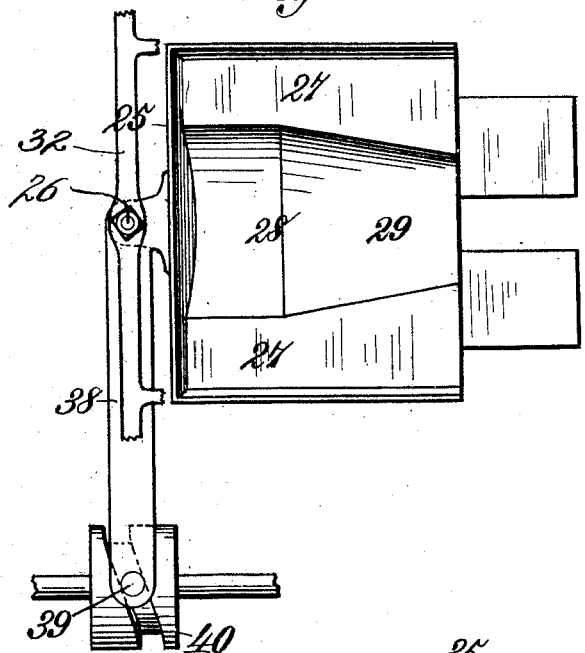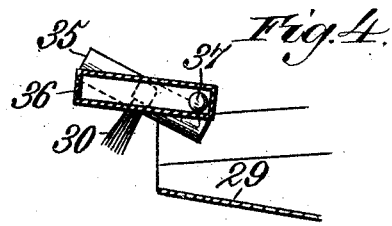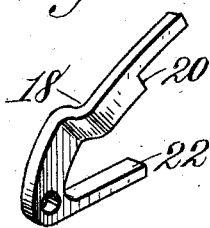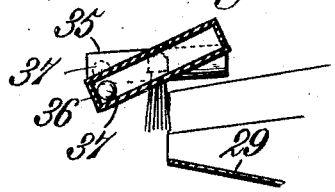

UNITED STATES PATENT OFFICE.

HENRY RICHARDSON, OF NEW YORK, N. Y.

WEIGHING-MACHINE.

975,158.     Specification of Letters Patent.     Patented Nov. 8, 1910.

Application filed August 19, 1909. Serial No. 513,703.

*To all whom it may concern:*

Be it known that I, HENRY RICHARDSON, a subject of the King of Great Britain, residing at New York, in the county of New York and State of New York, have invented certain new and useful Improvements in Weighing-Machines, of which the following is a specification.

The present invention relates to improvements in weighing machines, and it has for its object primarily to provide an automatic weighing machine capable of operating continuously and of the type embodying a revoluble pocketed hopper in combination with a feed gate which is automatically controlled by the rising and falling movements of the hopper due to its receiving and dumping the charges of material whereby the material will be weighed out in proper charges and the machine is capable of operating without requiring the attention of an attendant.

Another object of the invention is to provide novel and efficient means for feeding the material to the revoluble weigh hopper whereby the bulk of each charge is quickly fed to the hopper while the final descent of the hopper is accomplished by a dribble feed of a simple construction which is efficient in its operation.

Another object of the invention is to provide a machine of the class specified embodying means for controlling the return movements of the weigh hopper after the latter discharges each load of material whereby all shock or jar is avoided, such controlling means operating during the discharge movement of the weigh hopper.

Further objects are to provide a simple and improved feed gate, the opening and controlling movements of which are controlled not only by the rising and falling movements of the weigh hopper, but are influenced by means acting thereon to effect a quick closing of the gate the moment the weigh hopper has received a proper charge of material whereby accuracy in the weighing of the material is insured and there is no liability of the gate remaining open or partially open during the discharging operation and, moreover, the present invention provides simple and improved devices for positioning the different pockets of the weigh hopper in charge-receiving condition and for automatically tripping or releasing the weigh hopper after each pocket has received its full charge.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a side elevation partly in vertical section of an automatic weighing machine constructed in accordance with the present invention; Fig. 2 is a side elevation of the machine as shown in Fig. 1; Fig. 3 is a detail plan view of the shaker bottom or pan, together with the means for vibrating it; Figs. 4 and 5 are detail sectional views showing the outlet of the shaker bottom or pan, together with the feed gate or brush and the devices acting thereon to effect a quick closing of the gate; and Fig. 6 is a detail perspective view of the trigger for tripping and releasing the weigh hopper after it has received a full charge of material.

Similar parts are designated by the same reference characters in the several views.

In the accompanying drawing, I have shown one specific embodiment of the invention as an example, the machine shown being well adapted for weighing predetermined charges of tea and other materials. It will be understood, however, that certain modifications and changes may be made therein in order to adapt the invention to the best advantage in each particular case, the present embodiment of the invention being shown as an example.

In the present instance, the machine comprises a suitable frame 1 having a feed hopper 2 supported in an appropriate position, and 3 designates the weigh hopper which in the present instance is provided with a suitable number of partitions 4 which may be radial and form an appropriate number of pockets 5 into which the material is fed from the hopper 2 by means of the feed devices to be hereinafter described. The weigh hopper is revoluble and is supported by a counterpoise. In the present instance, the weigh hopper has a shaft or trunnions 6 which are journaled in appropriate bearings depending from a frame 7, the latter being maintained in substantially a horizontal position by means of the depending arm 8 and a link 9, one end of this link being attached to the depending arm while its opposite end is pivotally connected to a suitable part of the frame this arrangement, however, permitting the weigh hopper to rise and fall freely. The frame 7 which carries the weigh hopper is supported by a weigh beam 10 which is fulcrumed on a support 11 of the frame, one end of the weigh beam being provided with a counterpoise 12 while its opposite end is connected to the frame 7 through the medium of the knife-edge bearings 13.

During the operation of the machine, the pockets in the weigh hopper are successively positioned to receive the charges of material and after a full charge of material has been received in each pocket, the weigh hopper will settle and after being released will rotate and dump such charge. In the present instance, the controlling means for the weigh hopper consists of a set of pins or projections 14 of a number corresponding to the number of pockets in the weigh hopper, and these pins may project from one side of the weigh hopper, as shown. A stationary stop 15 is provided which successively coöperates with these pins or projections and thus successively positions the pockets of the weigh hopper to receive the charges of material, this stop in the present instance being shown as a lug or projection fixed to an adjacent part of the frame. The pins or projections 14 on the weigh hopper are in position to engage the stop 15 after the weigh hopper has been elevated due to the discharge of the load, although these pins or projections on the weigh hopper will fall below and free themselves from this stop after the weigh hopper has received a full load and has descended.

In order to retain the weigh hopper in a proper load-receiving position and to prevent rebounding of the pin or projection 14 from the stop, I preferably provide a latch 16 which in the present instance is pivoted to a suitable part of the frame and is arranged in the path of the projections 14, these projections being capable of deflecting the latch until such projections engage the stop whereupon the latch 16 will fall into a position behind the projection and thus prevent retrograde movement of the weigh hopper. A pin 17 is shown which operates in a slot in the latch and thus limits its movement.

According to the present invention, the weigh hopper is automatically released when it has received a full charge of material. In the present instance, a trigger 18 is shown, such trigger being pivoted at 19 on a part of the frame 7 and the trigger has a pair of arms one of which is provided with a notch 20 to successively receive the pins or projections 14 on the weigh hopper while the remaining arm of the trigger is arranged above a tripping pin or projection 21 which may, as shown, be supported on a suitable part of the frame. While the weigh hopper is in charge-receiving position, one of the pins or projections 14 will abut against the rear face of the stop 15 while another of such pins or projections will rest loosely in the notch 20 of the trigger. After the weigh hopper has settled sufficiently to permit that pin or projection engaged by the stop to free itself from the stop, the weight of the material in the hopper will turn it slightly so as to bring the next projection into a position to be held by the trigger, the latter then holding the hopper from dumping movement. A further descent of the weigh hopper, however, will bring the arm 22 on the trigger into engagement with the stationary projection 21 on the frame and as the hopper continues to descend, the pin or projection on the hopper previously held by the trigger will be released, thereby permitting sufficient rotation of the weigh hopper to discharge such load of material. After the charge has been dumped from the weigh hopper, the counterpoise 12 will, of course, operate to return the weigh hopper to elevated position, preparatory to its reception of the next charge, the next pin or projection on the weigh hopper being thereby brought into position to pass the latch 16 and abut against the stop 15 so as to position the weigh hopper for the next charge.

In order to so control the return movement of the weigh hopper so as to avoid shock to the machine, I provide means for gradually returning the weigh hopper to elevated position while it is dumping a load. The means shown in the present instance consists of one or more rollers or projections 23 which may be supported on a suitable stationary part of the machine frame, a pair of these rollers being shown in the present instance and are arranged to coöperate with the peripheral edges 24 of the weigh hopper, these edges being formed as eccentric cams and are of a number corresponding to the number of pockets in the weigh hopper. When the weigh hopper descends into a load-discharging position, these rollers or projections 23 will engage those portions of the cams nearest the center of the weigh hopper and during the rotation of the weigh hopper under the weight of the material therein, these rollers will traverse the cam surfaces which cam surfaces will operate to gradually restore the weigh hopper to elevated position.

The present invention also provides means for effectively feeding the material from the supply chute 2 to the weigh hopper whereby clogging or bridging of the material is prevented and an accurate weighing of the charges is accomplished. In the present instance, I have shown a shaker bottom or pan 25 which forms the bottom of the supply chute or hopper 2 and this shaker bottom is pivoted on an axis 26 which is preferably vertical and arranged at the rear of the supply chute. The rear and two sides of the shaker bottom are closed while the front thereof is open to provide an outlet for the material. This shaker pan, however, has a main feeding surface 27 which slopes downwardly toward the mouth or outlet and it also has a dribble pocket 28 the outlet of which is reduced by the upwardly sloping surface 29 thereof whereby the material before discharging through the outlet of the dribble pocket must flow upwardly. To render the operation of the machine automatic, the feed of the material to the weigh hopper is controlled by the rising and falling movements of the weigh hopper. In the present instance, I have shown a feed gate for controlling the discharge of material through the outlet of the shaker bottom or pan, this feed gate being preferably in the form of a brush 30 which is mounted on a shaft 31 suitably journaled in bearings 32, and this shaft is provided with a crank 33 which crank is connected by a rod or link 34 to the frame 7 which carries the weigh hopper. A descent of the weigh hopper due to the weight of a charge of material therein will turn the crank 33 in a direction to close the outlet of the shaker pan by the brush 30 acting as a feed gate, while a rising of the weigh hopper due to the discharge of the material therein will cause a reverse movement of the brush to open the outlet of the shaker pan and thus permit a flow of material to the weigh hopper. In order to control the closing of the feed gate or brush so as to produce a quick cut off of the material after the weigh hopper has received a proper charge of the material, I provide one or more devices which operate automatically after the brush or feed gate has reached a predetermined position and act to complete the closing of the feed gate or brush by a quick movement. To effect this result, I provide one or more shiftable bodies which act when the feed gate or brush reaches a predetermined position. In the present instance, I have shown a pair of such devices comprising tubes 35 and 36 which form raceways and are both mounted to turn with the shaft 31 which operates the feed gate or brush, these tubes, however, being arranged at different angles. The opposite ends of the tubes are closed and within each tube is mounted a ball 37. The angular relation of these tubes with respect to the position of the feed gate or brush is such that the ball of the tube 36 which is arranged at the lesser angle to the horizontal will shift its position to the opposite end of the tube when the feed gate or brush reaches a partially closed position to effect a steady closing of the brush or gate, and when the gate or brush reaches a nearly closed position, the ball of the tube 35 will then shift its position and effect a quick closing of the gate or brush whereby the supply of material to the weigh hopper is immediately cut off.

The shaker pan preferably vibrates continuously during the operation of the machine and any suitable means may be provided for effecting this result. An arm 38 is provided in the present instance which is rigidly attached to a suitable part of the shaker pan and carries a pin or projection 39 which follows the slot or groove in an appropriately formed cam 40 which latter may be rotated continuously from a suitable shaft.

The operation of the machine may be briefly described as follows: Assuming the supply chute or hopper to be filled with material and the weigh hopper to be in elevated position as shown in Fig. 1, the material in the supply hopper and supported by the shaker bottom or pan will flow in a stream through the entire outlet provided in the shaker pan, this flow being facilitated by the vibratory movement of the pan and the discharge of the material being permitted by the feed gate or brush 30 which is in open position while the weigh hopper is elevated. During the flow of the material into the weigh hopper, the latter is held in proper position by means of the stop 15. When the weigh hopper has received approximately a full charge of the material it will settle and in doing so the projection 14 on the weigh hopper will free itself from the stop 15 while another projection on the weigh hopper will engage and be held by the notch 20 in the trigger. The descent of the weigh hopper will also turn the feed gate or brush toward closed position, thereby reducing the size of the stream flowing into the weigh hopper, the outlet of the dribble pocket 28 being the only opening through which the material then discharges. Owing to the upward inclination of the surface 29 of the dribble pocket which leads to the outlet thereof, the material during the dribble action is regularly fed to the scale, and is not perceptibly influenced by any variation in the pressure or head of the material in the supply chute or hopper. As soon as the weigh hopper receives a full charge, it will settle sufficiently to bring the arm 22 of the trigger into contact with the tripping projection 21, the trigger being thereby moved into releasing position and the weigh hopper rotates and discharges the material therefrom. When the weigh hopper settles, the eccentric cam surfaces 24 on its edges rest on and ride over the rollers or projections 23, and during the rotation of the weigh hopper in discharging the load, these rollers or projections coöperating with the eccentric cam surfaces gradually restore the weigh hopper to elevated position to receive the next charge of material and the rising of the weigh hopper operates through the rod 34 to turn the feed gate or brush into open position, thereby reëstablishing the flow of material to the weigh hopper. The weigh hopper, as previously described, is positioned for the next charge by the engagement of one of the projections 14 thereon with the stop 15.

I claim as my invention:—

1. A weighing machine comprising a supply hopper, a movably supported weigh hopper, a movably mounted brush coöperative with the supply hopper as a feed gate for controlling the flow of material to the weigh hopper, and means for controlling the opening and closing movements of the brush according to the movements of the weigh hopper.

2. A weighing machine comprising a counterpoised weigh hopper, a supply hopper, a brush coöperative with the supply hopper as a gate for controlling the flow of material to the weigh hopper, and means controlled by the rising and falling movements of the weigh hopper for operating said brush to regulate the supply of material to the hopper.

3. A weighing machine comprising a counterpoised weigh hopper, a supply hopper having a vibratory bottom, a brush coöperative with the vibratory bottom of said supply hopper for controlling the supply of material to the weigh hopper, and means controlled by the settling movements of the weigh hopper for moving said brush to closed position.

4. A weighing machine comprising a counterpoised revoluble weigh hopper, a supply hopper having a vibratory outlet, and a movably mounted brush coöperative with the vibratory outlet of said supply hopper and controllable by the rising and falling of the weigh hopper for regulating the supply of material to the weigh hopper.

5. A weighing machine comprising a movably supported weigh hopper, a supply hopper having a vibratory outlet, a pivoted brush coöperative with said outlet of the supply hopper and controlled by the movements of the weigh hopper for regulating the supply of material thereto, and devices operative to produce a quick closing of said brush when the weigh hopper assumes a predetermined position.

6. A weighing machine comprising a counterpoised weigh hopper, a supply hopper, a valve connected to be closed and opened by the falling and rising movement of the weigh hopper, and a plurality of tubes containing successively operative devices acting automatically on said valve to produce an accelerated closing movement thereof when the weigh hopper reaches a predetermined position in its descent.

7. The combination of a weighing machine comprising a counterpoised weigh hopper, a supply hopper, a pivoted valve for controlling the flow of material from the supply hopper to the weigh hopper, and successively operative movable bodies controlled by the turning movement of the valve for producing a quick closing thereof.

8. The combination of a weighing machine comprising a counterpoised weigh hopper, a supply hopper, a pivoted valve controlled by the rising and falling movements of the weigh hopper for regulating the supply of material thereto, and a plurality of tubes or containers arranged at different relative angles and tiltable by the valve and movable bodies contained in said tubes and operative to control the movement of the valve.

9. The combination of a weighing machine comprising a counterpoised weigh hopper, a supply hopper having a horizontal vibratory bottom, a pivoted brush coöperative with said vibratory bottom for controlling the flow of material from the supply hopper to the weigh hopper, and an operative connection between the counterpoised weigh hopper and said brush for automatically controlling the opening and closing movements of the latter according to the rising and falling movements of the weigh hopper.

10. A weighing machine comprising a revoluble weigh hopper provided with charge-receiving pockets and having on its periphery a series of eccentric cam surfaces, a counterpoised frame guided to move vertically and form a support upon which said hopper is journaled, a steadying roller or projection coöperative successively with said cam surfaces on the weigh hopper during the dumping operations thereof, for gradually lifting and returning the weigh hopper to charge-receiving position after each dumping operation, a supply hopper, a feed valve controlling the flow of material from the supply hopper into the weigh hopper, and an operative connection between the feed valve and said vertically movable frame for automatically opening and closing the feed valve during the rising and falling movements of said frame.

11. A weighing machine comprising a revoluble weigh hopper provided with charge-receiving pockets and having a series of eccentric cam surfaces on its periphery, a counterpoised frame guided to move vertically and forming a support for the weigh hopper, a steadying roller or projection coöperative successively with the cam surfaces on the weigh hopper during the dumping operations thereof, for gradually lifting and returning the weigh hopper to charge-receiving position after each dumping operation, a supply hopper, a pivoted feed valve for controlling the flow of material from the supply hopper to the weigh hopper, a tube tiltable during the turning movements of the feed valve and containing a movable body operative to accelerate the opening and closing movements of such valve, and an operative connection between the pivoted feed valve and the vertically movable frame supporting the weigh hopper.

12. A weighing machine embodying a revoluble counterpoised weigh hopper having charge-receiving pockets, a relatively fixed stop, projections movable with the weigh-hopper, said stop coöperating with one of said projections to hold the hopper in load-receiving position, the settling of the hopper serving to free said projections from the stop, and a releasing trigger mounted to engage a projection on the hopper subsequent to the settling thereof.

13. A weighing machine embodying a revoluble counterpoised weigh hopper having pockets to receive charges of material, a relatively fixed stop, a projection movable with the weigh hopper and arranged to coöperate with said stop to retain the hopper in charge-receiving position, settling of the hopper freeing the projection from the stop, and a tripping device operative to hold the hopper from dumping until the latter has received a full charge of material.

14. A weighing machine comprising a revoluble counterpoised weigh hopper having a plurality of charge-receiving pockets, a relatively fixed stop, a set of projections movable with the weigh hopper and coöperative successively with said stop to retain the hopper in the different charge-receiving positions, a latch arranged in coöperative relation with said stop for preventing retrograde movement of the weigh hopper, and a trigger mounted so as to settle with the weigh hopper and releasable to permit dumping thereof.

15. A weighing machine comprising a revoluble counterpoised weigh hopper, means for holding said hopper in charge-receiving position until the hopper has settled to a predetermined extent, a trigger mounted to settle with the weigh hopper and coöperative with the weigh hopper subsequent to the release of the hopper from said holding means to control the dumping thereof, and a tripping projection coöperative with the trigger after the weigh hopper has settled under the weight of a full load for releasing the weigh hopper and permitting dumping thereof.

16. In a weighing machine, the combination of a weigh hopper, a supply hopper, and means for controlling the flow of material from the supply hopper involving an upwardly sloping laterally vibratory surface along which the material must travel before discharging.

17. In a weighing machine, the combination of a weigh hopper, a supply hopper, and means for regulating the flow of material from the supply hopper embodying a main supply provided with a relatively large outlet, a valve controlling said outlet and a dribble pocket having a surface which slopes upwardly toward its outlet.

18. In a weighing machine, the combination of a weigh hopper, a supply hopper, and a vibratory shaker pan arranged to receive the material from the supply hopper and discharge it into the weigh hopper and having means for vibrating it horizontally and in a direction transverse to the flow of the material thereon.

19. In a weighing machine, the combination of a weigh hopper, a supply hopper, and a shaker bottom mounted to vibrate transversely of the lower end of the supply hopper and provided with full flow and dribble feed outlets.

In testimony whereof I have hereunto set my hand in presence of two subscribing witnesses.

HENRY RICHARDSON.

Witnesses:
S. G. MURRAY,
J. P. CLIFFORD.